UNITED STATES PATENT OFFICE.

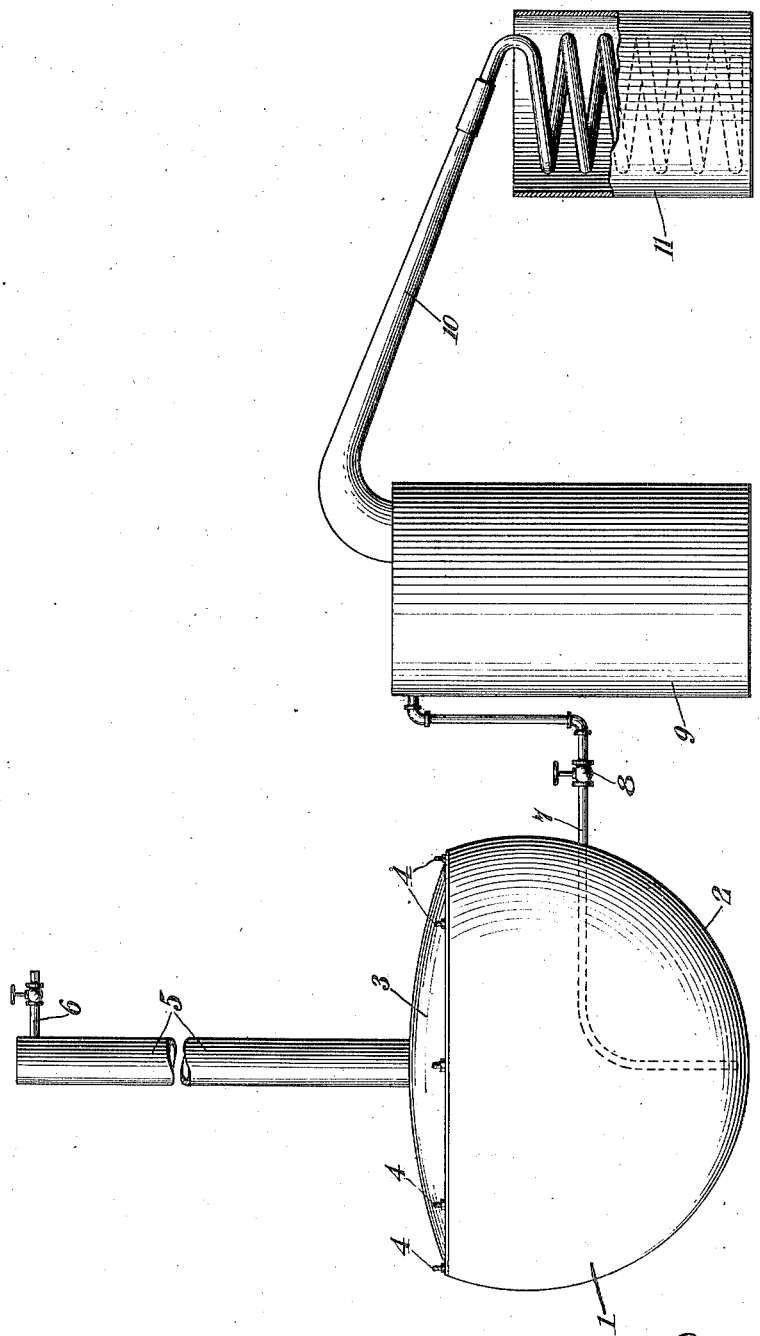

ARTHUR EARL HOULEHAN, OF WILMINGTON, DELAWARE, ASSIGNOR TO E. I. DU PONT DE NEMOURS AND COMPANY, OF WILMINGTON, DELAWARE, A CORPORATION OF DELAWARE.

APPARATUS FOR THE MANUFACTURE OF DIPHENYLAMIN.

1,308,356.  Specification of Letters Patent.  Patented July 1, 1919.

Application filed May 25, 1917. Serial No. 170,807.

*To all whom it may concern:*

Be it known that I, ARTHUR EARL HOULEHAN, of Wilmington, in the county of New Castle, and in the State of Delaware, have invented a certain new and useful Improvement in Apparatus for the Manufacture of Diphenylamin, and do hereby declare that the following is a full, clear, and exact description thereof.

My invention relates particularly to an apparatus for producing diphenylamin by the action of a catalyst upon anilin, and similar re-actions.

The object of my invention is to provide an apparatus which may be used advantageously in connection with the process set forth in my application for a process for the manufacture of diphenylamin, filed of even date herewith.

While my invention is capable of embodiment in many different forms for the purpose of illustration, I have shown only one form thereof in the accompanying drawings, in which—

The figure is a side elevation of an apparatus made in accordance with my invention with part of the wall of the condenser broken away.

In the drawings I have shown an autoclave 1, comprising a container 2, which may be made of iron, to which there is adapted to be attached a lid 3, which may also be made of iron and which may be attached to the container 2 by means of bolts 4. On the lid 3 there is, furthermore, provided a column 5, having a valved outlet pipe 6, at its upper end. The autoclave may have an outlet pipe 7 having a hand valve 8 leading to a still 9 of any suitable character, having a vapor outlet pipe 10, leading to a condenser 11.

I may, for example, carry out my invention as follows: I may use the apparatus made in accordance with my invention in the following manner:

A quantity of anilin mixed with a small percentage of a catalyst, as for example ammonium iodid, the catalyst, however, preferably being about 1% to 4% of the anilin is inserted in the autoclave 1 and the cover 3 tightly secured to the same. Heat is now applied to the autoclave and the contents are subjected to heat and pressure in this manner for any suitable length of time; but preferably forty-eight hours. The anilin becomes transformed into diphenylamin, in accordance with the following equation:

$$2C_6H_5.NH_2 = C_6H_5.NH.C_6H_5 + NH_3.$$

By providing the column 5 and the valved outlet pipe 6, I am enabled to release by means of said pipe 6 the ammonia, which accumulates from time to time without losing the anilin, as the column 5 has the effect of condensing the anilin and returning the same to the container 2 under the cooling effect of the air, while the ammonia segregates and accumulates in the top of the column 5. In this way the reaction may be carried more nearly to completion, owing to the fact that the ammonia produced in the process is removed from the presence of the anilin.

With the percentages of the iodin catalyst less than 1%, the reaction takes place very slowly, and, therefore, requires heating for a long period of time, thus increasing the cost of operation. With amounts of catalyst greater than 4% the rate of condensation is increased to some extent, but this is offset by the greater loss of material, due to the increased formation of tar.

We have found, furthermore, that the temperature used should be about 300° C., although temperatures from 275 to 300° C. may be used, as at lower temperatures the rate of formation is very slow and at higher temperatures the formation of tar is increased.

The catalyst used may be iodin, but preferably instead of iodin I use a compound containing iodin, as, for example, ammonium iodid or anilin hydrogen iodid. In the case where I use such iodids I preferably make use of from 1 to 4% of the same. I find that by using such iodids a more rapid condensation of the anilin to diphenylamin takes place, thus giving a larger yield in a shorter time and, consequently, reducing the operating costs. In any case the catalyst is such as can be readily broken down so as to provide either a free halogen or the hydrid thereof.

I have found, furthermore, that in carrying out the process it is practically essential that a small amount of water be present, preferably about 1% of water, but the best results are obtained by an amount of water of not less than .75% and not more than 2% as an amount of water above this percentage is objectionable owing to the increased pressure although it is not disadvantageous chemically. I have found that the condensation from anilin to diphenylamin could not take place in the absence of water. After the mixture has been digested in the autoclave 1, it is blown out through the pipe 7 into the still 9, and there distilled, three fractions being collected. The first fraction, which distils up to 200° C. consists mainly of unchanged anilin, together with a small amount of diphenylamin and is stored for re-digestion with a fresh amount of catalyst. The second fraction, distilling between 200° and 300° C. consists of a mixture of anilin with a larger amount of diphenylamin. The larger part of the latter may be recovered from this fraction by redistillation. The main body of the diphenylamin is collected in the fraction which distils over and above 300° C. A tarry residue is left in the still from which the catalyst can be recovered.

While I have described my invention above in detail, I wish it to be understood that many changes may be made therein, without departing from the spirit of my invention.

I claim:—

1. An apparatus comprising an autoclave adapted to withstand high pressure and having a column of substantial length thereon.

2. An apparatus comprising an autoclave having a column of substantial length thereon, and a valved outlet pipe near the upper end of the column.

3. An apparatus for generating diphenylamin comprising an autoclave having a column thereon adapted to segregate any ammonia which may be formed, said column being of sufficient height to separate anilin from ammonia by condensation of the former due to cooling by the air.

4. An apparatus for generating diphenylamin comprising an autoclave having a column thereon adapted to segregate any ammonia which may be formed, said column being of sufficient height to separate anilin from ammonia by condensation of the former due to cooling by the air, and a valved outlet pipe near the upper end of the column.

5. An apparatus comprising an autoclave having a column of substantial length thereon, and a blow-out pipe for the liquid in the autoclave.

6. An apparatus comprising an autoclave having a column thereon of substantial length, a valved outlet pipe near the upper end of the column, and a blow-out pipe for the liquid in the autoclave.

7. An apparatus for generating diphenylamin comprising an autoclave having a column thereon adapted to segregate any ammonia which may be formed, said column being of sufficient height to separate anilin from ammonia by condensation of the former due to cooling by the air, and a blow-out pipe for the liquid in the autoclave.

8. An apparatus for generating diphenylamin comprising an autoclave having a column thereon adapted to segregate any ammonia which may be formed, said column being of sufficient height to separate anilin from ammonia by condensation of the former due to cooling by the air, a valved outlet pipe near the upper end of the column, and a blow-out pipe for the liquid in the autoclave.

9. An apparatus comprising an autoclave having a column of substantial length thereon, a blow-out pipe for the liquid in the autoclave, and a still connected to the blow-out pipe.

10. An apparatus comprisng an autoclave having a column of substantial length thereon, a valved outlet pipe near the upper end of the column, a blow-out pipe for the liquid in the autoclave, and a still connected to the blow-out pipe.

11. An apparatus for generating diphenylamin comprising an autoclave having a column thereon, adapted to segregate any ammonia which may be formed, said column being of sufficient height to separate anilin from ammonia by condensation of the former due to cooling by the air, a blow-out pipe for the liquid in the autoclave, and a still connected to the blow-out pipe.

12. An apparatus for generating diphenylamin comprising an autoclave having a column thereon adapted to segregate any ammonia which may be formed, said column being of sufficient height to separate anilin from ammonia by condensation of the former due to cooling by the air, a valved outlet pipe near the upper end of the column, a blow-out pipe for the liquid in the autoclave, and a still connected to the blow-out pipe.

In testimony that I claim the foregoing I have hereunto set my hand.

ARTHUR EARL HOULEHAN.

Witnesses:
A. M. GORMAN,
P. E. STRICKLAND.